US007544427B2

(12) United States Patent
Oka

(10) Patent No.: US 7,544,427 B2
(45) Date of Patent: Jun. 9, 2009

(54) WOODY ELECTRIC-WAVE-ABSORBING BUILDING MATERIAL

(75) Inventor: Hideo Oka, Morioka (JP)

(73) Assignee: Incorporated National University Iwate University, Morioka-shi (JP)

( * ) Notice: Subject to any disclaimer, the term of this patent is extended or adjusted under 35 U.S.C. 154(b) by 201 days.

(21) Appl. No.: 10/586,471

(22) PCT Filed: Dec. 20, 2004

(86) PCT No.: PCT/JP2004/018998

§ 371 (c)(1), (2), (4) Date: Jul. 18, 2006

(87) PCT Pub. No.: WO2005/069712

PCT Pub. Date: Jul. 28, 2005

(65) Prior Publication Data

US 2007/0164893 A1 Jul. 19, 2007

(30) Foreign Application Priority Data

Jan. 19, 2004 (JP) ............................ 2004-011249

(51) Int. Cl.
*G11B 23/00* (2006.01)

(52) U.S. Cl. ................. 428/692; 428/355 R; 428/537.1

(58) Field of Classification Search ................. 428/692, 428/355 R, 537.1
See application file for complete search history.

(56) References Cited

U.S. PATENT DOCUMENTS 3,437,777 A * 4/1969 Chiba Shu et al. .......... 219/750
5,945,213 A * 8/1999 Nagaike et al. ............. 428/336
6,534,176 B2 * 3/2003 Terase et al. ................ 428/403
6,566,414 B2 * 5/2003 Takeshima et al. .......... 522/100

FOREIGN PATENT DOCUMENTS

JP 50-155999 A 12/1975
JP 61-269399 A 11/1986
JP 63-155699 U 10/1988
JP 1-191500 A 8/1989
JP 3-20498 U 2/1991
JP 05-299872 * 11/1993
JP 5-299872 A 11/1993
JP 6-209180 A 7/1994
JP 6-82943 B2 10/1994
JP 6-85472 B2 10/1994
JP 8-18272 A 1/1996
JP 9-283971 A 10/1997
JP 11-354972 A 12/1999
JP 2000-200990 A 7/2000
JP 2000-228598 A 8/2000
JP 2001-118711 * 4/2001
JP 2001-118711 A 4/2001
JP 2001-274587 A 10/2001
JP 2002-084090 * 3/2002
JP 2002-84090 A 3/2002
JP 2003-60381 A 2/2003

OTHER PUBLICATIONS

Koichi Narita et al., “Experimental study on manufacturing magnetic wood using . . . ”, Technical Report of IEICE EMCJ99-129 (Jan. 2000).
Koichi Narita et al., “Manufacturing method of sandwich-type magnetic wood and . . . ”, Technical Report of IEICE EMCJ99-6 (Apr. 1999).
H. Oka, “Basic Study on Magnetic Wood”, The Magnetic Society of Japan Journal, vol. 23, No. 2, 1999.
Hideo Oka et al., “Experimental results on indoor electromagnetic wave absorber using magnetic wood”, Journal of Applied Physics, vol. 91, No. 10, Parts 2 and 3, May 2002.
Ian Sample, “Turn off your phone, or we’ll do it for you”, New Scientist, p. 20, Jun. 29, 2002.
International Search Report mailed Mar. 29, 2005 of International Application PCT/JP2004/018998.

* cited by examiner

*Primary Examiner*—Leszek Kiliman
(74) *Attorney, Agent, or Firm*—Westerman, Hattori, Daniels & Adrian, LLP.

(57) ABSTRACT

[Object] Various electric wave absorbers for the GHz band have been developed. However, parameters for obtaining the optimal electric wave absorption characteristic are only the shape and the content of a dielectric material or a conductive material, and the degree of freedom of the parameters has been small. Furthermore, in a recent wireless LAN, electric wave absorbers that can be used for absorbing potentially dangerous electric waves in a plurality of bands, for example, in two frequency bands of 2.45 GHz band and 5.2 GHz band, have also been desired. [Solving Means ] In a woody electric wave absorber including a laminated magnetic woody material prepared by bonding facing plates composed of natural wood or a processed woody material with a magnetic layer composed of an adhesive containing a ferrite powder therebetween under pressure, the magnetic layer contains a nonmagnetic stainless steel powder in an amount in the range of 20 to 80 volume percent relative to the ferrite powder, the total volume content of the ferrite powder and the nonmagnetic stainless steel powder in the magnetic layer is in the range of 10% to 40%, the thickness of the magnetic layer is in the range of 0.5 to 5.0 mm, and the woody electric wave absorber has an electric wave absorption characteristic in which the center frequency of the electric waves absorbed lies in the range of 1 to 8 GHz and the amount of electric wave absorption is 10 dB or more in a 2.45 GHz frequency band or a 5.2 GHz frequency band.

3 Claims, 6 Drawing Sheets

$d_M$=1.0mm $V_S$ =10Vol%

$V_S$ =20Vol%

$V_S$ =30Vol%

WOODY ELECTRIC-WAVE-ABSORBING BUILDING MATERIAL

TECHNICAL FIELD

The present invention relates to a woody electric-wave-absorbing building material which has an excellent performance for absorbing electric waves in a band of several gigahertz for cell phones and the like and in which the performance can be easily adjusted.

BACKGROUND ART

In a frequency domain in the range of 10 MHz to 1 GHz, ferrite, carbon, or the like is mainly used as a dielectric loss material or a conductive loss material for electric wave absorbers. In a frequency domain of 1 GHz or higher, a conductive metal plate, a metal net, a metal fiber or the like is used. These materials are usually combined with a plastic, a rubber, or the like and then used as an electric wave absorber in the form of a sheet.

Recently, in particular, a thin electric wave absorber used for the GHz band has been desired, and various novel materials have been actively developed. Examples thereof include a material produced by dispersing carbon fiber in a calcium silicate molded article (Patent Document 1); a material produced by mixing a powder of magnetoplumbite-type hexagonal ferrite with a holding material composed of, for example, a rubber, a resin, or an inorganic material such as calcium silicate (Patent Document 2); a material produced by dispersing a soft magnetic powder composed of an Fe-based alloy containing 5 to 35 weight percent of Cr in a rubber or a resin (Patent Document 3); a material produced by mixing and dispersing a soft magnetic flake powder composed of a stainless steel SUS 430 with a synthetic resin (Patent Document 4); and a material including an inorganic fiber, a resin binder, and a fiber or a powder having conductivity or magnetism and having a porosity in the range of 35% to 89% (Patent Document 5).

An example of an electric wave absorber including a general building material is an inner wall material for absorbing electromagnetic waves in a band in the range of 70 MHz to 3 GHz, the inner wall material containing gypsum, asbestos cement, or calcium silicate as a main material and a carbon powder, a ferrite powder, a metal powder, a metal compound powder, or a mixture thereof, which is an electromagnetic wave loss material (Patent Document 6).

Examples of known woody electric wave absorbers include an absorber produced by joining a small pieces of electromagnetic wave shielding material with a woody material using an adhesive (Patent Document 7) and an absorber produced by mixing a carbon powder or a carbon fiber with wood chips (Patent Documents 8, 9, and 10). The present inventor has developed a magnetic woody material, which is a novel building material, having functions such as magnetic absorbability and electric wave shielding (Patent Document 11 and Non-Patent Documents 1 to 3).

Patent Document 1: Japanese Unexamined Patent Application Publication No. 9-283971

Patent Document 2: Japanese Unexamined Patent Application Publication No. 11-354972

Patent Document 3: Japanese Unexamined Patent Application Publication No. 2000-200990

Patent Document 4: Japanese Unexamined Patent Application Publication No. 2001-274587

Patent Document 5: Japanese Unexamined Patent Application Publication No. 2003-60381

Patent Document 6: Japanese Unexamined Patent Application Publication No. 6-209180

Patent Document 7: Japanese Unexamined Patent Application Publication No. 61-269399

Patent Document 8: Japanese Unexamined Patent Application Publication No. 1-191500

Patent Document 9: Japanese Examined Patent Application Publication No. 6-82943

Patent Document 10: Japanese Examined Patent Application Publication No. 6-85472

Patent Document 11: Japanese Unexamined Patent Application Publication No. 2001-118711

Non-Patent Document 1: Oka, Jisei mokuzai no kiso tokusei (Fundamental characteristics of magnetic woody materials), Nihon Oyo Jiki Gakkaishi (Journal of Magnetic Society of Japan), Vol. 23, No. 3, pp. 757-762 (1999)

Non-Patent Document 2: Journal of Applied Physics, Vol. 91, No. 10, Parts 2 and 3, 15 May, pp. 7008-7010 (2002)

Non-Patent Document 3: New Scientist, 29, June, p. 20 (2002)

DISCLOSURE OF INVENTION

Problems to be Solved by the Invention

Hitherto, regarding an electric wave absorber used in buildings, a construction method has been employed in which a metal plate, a metal foil, or a metal mesh having a characteristic of shielding interiors from electric waves is applied or a paint containing a metal is applied on the ceiling, the inner wall, the floor, the partition, or the like of rooms or areas that require electric wave shielding. However, metal plates completely reflect electromagnetic waves, that is, metal plates exhibit a transmission characteristic of zero, and thus it is difficult to control the electric wave absorption characteristic in an interior space. Ceramics, cement plates, and the like have been developed as known electric wave absorbers for general building materials, but these absorbers have various problems in view of their high specific gravity, processability, workability, cost, and the like.

As described in Patent Documents 7 to 10, electric-wave-absorbing woody materials suitable for building materials have been developed. However, the woody material described in Patent Document 7 is used for a frequency range of 50 to 500 MHz, the woody material described in Patent Document 8 is used for a frequency range of 30 kHz to 1 GHz, and the woody materials described in Patent Documents 9 and 10 are used for a frequency range of 10 to 50 MHz.

Recently, information communication apparatuses using electromagnetic waves in the range of about 1 to 10 GHz, for example, cell phones (frequency: 1.6 GHz), PHS phones (frequency: 1.9 GHz), indoor wireless LANs (frequency: 2.4 to 2.5 GHz and 5.15 to 5.25 GHz), industrial scientific medical (ISM) equipment (frequency: 2.4 to 2.5 GHz), and intelligent transport systems (ITS) (frequency: 5.8 GHz) have been gaining considerable popularity. On the other hand, problems caused by potentially dangerous electric waves, for example, malfunctions of apparatuses, accidents resulting in injury or death, the effect of cell phones on pacemakers, and the intrusion of the electric waves of cell phones into buildings such as music halls, restaurants, and hospitals have also been increasing.

Various electric wave absorbers such as those described in the above related art have been developed as electric wave absorbers for the GHz band that absorb these potentially dangerous electric waves. However, parameters for obtaining the optimal electric wave absorption characteristic are only the shape and the content of a dielectric material or a conductive material mixed in a holding material, and the degree of freedom of the parameters has been small. Furthermore, most of the known electric wave absorbers for the above frequency bands target a single frequency. However, in a recent wireless LAN, electric wave absorbers that can be used for absorbing potentially dangerous electric waves in a plurality of bands, for example, in two frequency bands of 2.45 GHz band and 5.2 GHz band, have also been desired.

Means for Solving the Problems

As one of a plurality of magnetic woody materials to which a magnetic property is imparted, the present inventors have developed plates formed of a woody material with a thickness of about 1 cm between which a magnetic layer with a thickness in the range of 1 to 4 mm that is prepared by mixing a ferrite powder with an adhesive is sandwiched. Since this woody material has a property of woodiness and an electric-wave-absorbing characteristic, the woody material has attracted attention as a material that can be used as an electric wave absorber without further process in the form of a woody building material or furniture. In addition to the characteristic of absorbing electric waves, for example, the feeling of woody material such as low specific gravity, ease of processing, and warmth; a sound-absorbing property; a humidity-controlling property; a thermal insulation performance can be imparted to the magnetic woody material. Cell phones cannot be used in music halls, restaurants, hospitals, and the like wherein this magnetic woody material is used as an inner wall material or the like.

The magnetic woody material developed by the present inventors uses the magnetic loss of a magnetic material such as Mn—Zn ferrite. Although the electric-wave-absorbing characteristic can be controlled to some extent by adjusting the thickness of the magnetic layer and the content of the magnetic material, the amount of electric wave absorption in the 2.45 GHz band is about 7 dB. Accordingly, it is necessary that the electric-wave-absorbing characteristic be further improved in a band required for the wireless LAN and ISM frequency band, and that the degree of freedom of design parameters be increased.

In the process of conducting extensive experiments on the mixing ratio of a ferrite powder, the thickness of a magnetic layer, and the use of other magnetic powder or a conductive powder, the present inventor has found that a woody electric wave absorber which has a better electric wave absorption characteristic in the wireless LAN and ISM frequency band and in which a required absorbing ability can be easily adjusted in a required band can be obtained by using a nonmagnetic stainless steel powder in combination with a ferrite powder.

Namely, the present invention provides (1) a woody electric-wave-absorber building material including a laminated magnetic woody material prepared by bonding facing plates each having a thickness in the range of 2 to 3 mm and composed of natural wood or a processed woody material with a magnetic layer composed of an adhesive containing a ferrite powder therebetween under pressure, wherein the magnetic layer contains a nonmagnetic stainless steel powder in an amount in the range of 30 to 50 volume percent relative to a Mn—Zn ferrite powder, the total volume content of the ferrite powder and the nonmagnetic stainless steel powder in the magnetic layer is in the range of 10% to 40%, the thickness of the magnetic layer is in the range of 1.0 to 4.0 mm, and the woody electric-wave-absorbing building material has an electric wave absorption characteristic in which the center frequency of the electric waves absorbed lies in the range of 1 to 8 GHz and the amount of electric wave absorption is 20 dB or more in a 2.45 GHz frequency band or a 5.2 GHz frequency band.

The present invention also provides (2) the woody electric-wave-absorbing building material according to (1) above, wherein the nonmagnetic stainless steel powder is composed of SUS 304 stainless steel.

The present invention also provides (3) the woody electric-wave-absorbing building material according to (2) above, wherein the ferrite powder has a median particle size in the range of 50 to 60 μm and a particle size range of 45 to 75 μm.

In the present invention, the electric wave absorption characteristic can be adjusted by controlling the volume content of a ferrite powder, the thickness of a magnetic layer, and the mixing ratio of the ferrite powder to a nonmagnetic stainless steel powder. FIG. 1 illustrates design parameters of the electric wave absorption characteristic of an electric wave absorber and shows the center frequency ($f_0$), and the maximum amount of absorption ($S_{max}$) and the half-width ΔW (−6 dB) at the center frequency ($f_0$).

In the electric-wave-absorbing building material of the present invention, as the thickness of the magnetic layer increases, the peak of the maximum amount of absorption ($S_{max}$) in the electric wave absorption characteristic is shifted to the lower frequency band. As the total volume content of the ferrite powder and the nonmagnetic stainless steel powder increases, the center frequency ($f_0$) in the electric wave absorption characteristic is markedly shifted with small changes in the internal ratio (nonmagnetic stainless steel powder:ferrite powder) and in the thickness of the magnetic layer. When the thickness of the magnetic layer is increased and the total volume content of the ferrite powder and the nonmagnetic stainless steel powder is decreased, the electric wave absorption characteristic shows a high and sharp peak in the low-frequency region. When the thickness of the magnetic layer is increased and the volume ratio of the nonmagnetic stainless steel powder in the magnetic layer is increased, an electric wave absorption characteristic having a high and sharp peak can be obtained in the low-frequency region.

When magnetic woody materials are applied to electric wave absorption, magnetic loss is the important parameter. Woody materials themselves are dielectric substances and transmit electric waves. When electric waves composed of an electric field and a magnetic field hit a woody material produced by sandwiching a magnetic layer between facing woody plates, since the magnetic layer has a magnetic loss characteristic, the magnetic field is converted into heat, and is absorbed. As the magnetic material constituting such a magnetic woody material, ferrite is preferred, but ferrite is a low-loss material. Nonmagnetic stainless steels are conductive materials. However, unlike soft magnetic stainless steels, which are usually used as electric wave absorbers, since nonmagnetic stainless steels are nonmagnetic, these stainless steels are considered to have the same magnetic characteristics as air space. Therefore, it is believed that the distance between particles of the ferrite powder is increased, and consequently, the demagnetizing field is increased to decrease the real part μ' of the complex permeability. Furthermore, a nonmagnetic stainless steel has an electric conductivity ($1.3\times10^4$ [/Ω·m]) lower than that of other metals having a high electric conductivity, for example, the electric conductivity of copper ($5.8\times10^7$ [/Ω·m]), and thus an increase in the imaginary part μ" of the complex permeability does not occur. However, the electric wave absorption characteristic that cannot be obtained using only a ferrite powder can be obtained by combining a nonmagnetic stainless steel powder. In addition, since copper is easily oxidized, copper is not suitably used together with woody materials having hygroscopicity. In contrast, SUS 304 stainless steel has excellent corrosion resistance.

Advantages of the Invention

Since an excellent electric wave absorption characteristic can be provided to a woody material, a desired electric wave absorption characteristic can be obtained by using the woody material as a building material or the like without using an electric wave absorber produced by adding the electric wave absorber to a known general building material, a woody product, or the like. Furthermore, the absorption band, and the size and half-width of the absorption peak can be controlled by adjusting the volume ratio of a nonmagnetic stainless steel powder added to a magnetic layer and the thickness of the magnetic layer. Therefore, the degree of freedom of the design of the electric wave absorber can be increased. An electric wave absorber that can be used for both the 2.45 GHz band and the 5.2 GHz band can be easily produced by merely adjusting the thickness of the magnetic layer and the volume ratio of the nonmagnetic stainless steel powder added to the magnetic layer.

Best Mode for Carrying Out the Invention

Laminated magnetic woody material plates sandwiching a magnetic layer are produced by disposing an adhesive containing a ferrite powder between two facing plates composed of, for example, natural wood or a processed woody material, bonding these two plates under pressure, and drying the plates with the adhesive. The thickness of each woody plate is preferably in the range of about 2 to 3 mm.

Examples of the ferrite powder include powders of Mn—Zn ferrite or Ni—Zn ferrite. Regarding the size of the ferrite powder, the median particle size is preferably about 50 to 60 μm, and the particle size is preferably in the range of about 45 to 75 μm.

Mn—Zn ferrite or Ni—Zn ferrite may be used alone. Alternatively, these two types of ferrite may be used in combination, thereby shifting the frequency at the maximum of the amount of electric wave absorption. As the mixing ratio of Mn—Zn ferrite increases, the frequency at the maximum amount of electric wave absorption can be shifted to a lower frequency while the amount of electric wave absorption is maintained in a high level.

Any type of adhesive may be used as long as the adhesive has a satisfactory adhesive force for bonding woody materials. Examples thereof include various adhesives selected from phenol resins, urethane resins, acrylic resins, cyanoacrylates, epoxy resins, and the like.

As the mixing ratio of the ferrite powder mixed in the adhesive increases, a laminated magnetic woody material has higher function of absorbing electric waves. However, when the mixing ratio is excessively high, a satisfactory adhesive strength cannot be achieved and at least two woody plates constituting the laminated magnetic woody material may be separated. Accordingly, the mixing ratio of the ferrite powder mixed in the adhesive must be determined so as not to impair the adhesive force.

In a method of producing the laminated magnetic woody material, an adhesive containing a ferrite powder is applied between two facing woody plates. The adhesive is preferably applied so as to have a uniform thickness so that the characteristic of absorbing electric waves and the mass are uniform throughout the laminated magnetic woody material.

After the adhesive is applied, the two woody plates are bonded under pressure and the adhesive is then dried to complete the laminated magnetic woody material. In this step, the bonding under pressure is preferably performed so as to provide a uniform thickness so that the characteristic of absorbing electric waves and the mass are uniform throughout the laminated magnetic woody material.

The plates used in this invention may not be necessarily flat plates. Various plates such as curved plates, blocks having a larger thickness, and plates having an irregular shape including projections or grooves may also be used.

In this invention, a nonmagnetic stainless steel powder is added in an amount of 20 to 80 volume percent and more preferably 30 to 50 volume percent relative to the ferrite powder, thereby achieving an electric wave absorption characteristic in which the maximum amount of absorption of 10 dB or more, and more preferably 20 dB or more in the ISM frequency band of 2.4 to 2.5 GHz. Stainless steels containing about 4 weight percent or more of Ni and about 12 to 30 weight percent of Cr are known as nonmagnetic stainless steels. A representative example of nonmagnetic stainless steels is SUS 304 (chromium-nickel-containing stainless steel: about 18 weight percent of Cr and about 8 weight percent of Ni), and a powder of this SUS 304 is preferably used. A nonmagnetic stainless steel powder having a median particle size of about 80 to 100 μm is preferred.

The total volume content of the magnetic powder and the nonmagnetic stainless steel powder in the magnetic layer formed after curing of the adhesive is in the range of 10% to 40% and more preferably in the range of 10% to 30%. The thickness of the magnetic layer is selected from the range of 0.5 to 5.0 mm. Since a satisfactorily large amount of electric wave absorption can be obtained with a thickness of 4.0 mm, the thickness is more preferably in the range of 1.0 to 4.0 mm.

The present invention will now be described in more detail on the basis of examples.

As shown in Table 1, samples (10F, 20F, and 30F) composed of only a ferrite powder Mn—Zn (BH2 manufactured by Tokin EMC Engineering Co., Ltd., median particle size: 58 μm), samples (10S, 20S, and 30S) composed of only a stainless steel powder (SUS 304 manufactured by Pacific Metals Co., Ltd., median particle size: 91 μm), and samples (SF14, FS23, FS32, and FS41) each composed of a mixture of the ferrite powder and the stainless steel powder were prepared so that the volume content in the magnetic layer (volume of powder/(volume of powder+volume of adhesive)) is 10, 20, or 30 volume percent.

TABLE 1

| Volume content Vs | 10 volume percent | 20 volume percent | 30 volume percent |
|---|---|---|---|
| F only | 10F | 20F | 30F |
| S:F = 1:4 | 10SF14 | 20SF14 | 30SF14 |
| S:F = 2:3 | 10SF23 | 20SF23 | 30SF23 |
| S:F = 3:2 | 10SF32 | 20SF32 | 30SF32 |
| S:F = 4:1 | 10SF41 | 20SF41 | 30SF41 |
| S only | 10S | 20S | 30S |

F: Ferrite,
S: Stainless Steel

The electric wave absorption characteristic was measured as follows. The ferrite powder and the stainless steel powder were mixed with an adhesive, and the mixture was sandwiched between two fiberboards and then dried to prepare laminated magnetic woody material samples. Each of the samples was separated into a magnetic layer and woody layers. Subsequently, as shown in FIG. 2(A), the magnetic layer was processed into a ring with an inner diameter of 3.00 mm, an outer diameter of 7.00 mm, and a thickness of h mm to prepare a sample S. The sample S was set in a sample holder H disposed between a 1-port cable A and a 2-port cable B provided in a network analyzer HP8720D (not shown in the figure), and the measurement was performed. Table 2 shows the conditions for the measurement of the electric wave absorption characteristic and for calculations. Regarding the material characteristics of the fiberboards, both the complex dielectric constant and the complex permeability were invariable in the measurement frequency.

TABLE 2

| | | |
|---|---|---|
| Measurement of S parameter | Measurement frequency band | 0.05 to 12 [GHz] |
| | Measurement points | 201 points |
| Calculation of material characteristics | Measurement model (Complex dielectric constant) | Baker-Jarvis method |
| | Measurement model (Complex permeability) | Nicolson-Ross method |
| Calculation of amount of electric wave absorption | Thickness of woody layer dW | 2.5 [mm] |
| | Thickness of magnetic layer dM | 0.5 to 4.0 [mm] |

EXAMPLE 1

For the total volume content Vs=20 volume percent, each of the samples having a ratio (by volume) of the ferrite powder to the stainless steel powder shown in Table 1 was mixed with a vinyl-acetate-resin-based emulsion adhesive (woodworking bond). The mixture was sandwiched between two fiberboards (specific gravity: 0.9 g/cm$^3$) each having a board thickness of 2.5 mm, and dried for about 96 hours to prepare a laminated magnetic woody material sample. The thickness of the magnetic layer was 4.0 mm.

FIGS. 3(A) and 3(B) show the measurement results of the amount of electric wave absorption in the frequency range of 0.05 to 12 GHz at which measurements were carried out. Referring to FIG. 3, in the magnetic layer dm=4.0 mm, the amount of electric wave absorption in the sample (20F) composed of only the ferrite powder was about 11 dB at about 1.5 GHz. The amounts of electric wave absorption in the samples having a ratio of the stainless steel of 20 volume percent (20FS14), 60 volume percent (20FS32), and 80 volume percent (20FS41) were about 18 dB, 26 dB, and 25dB, respectively, at about 2.5 GHz. On the other hand, the amount of electric wave absorption in the sample (20S) composed of only the stainless steel powder was about 12 dB at about 2.6 GHz.

EXAMPLE 2

Laminated magnetic woody material samples were prepared under the same conditions as in Example 1 except that the thickness of the magnetic layer was 1.0 mm. FIGS. 4(A) and 4(B) show the measurement results of the amount of electric wave absorption in the frequency range of 0.05 to 12 GHz at which measurements were carried out. The amounts of electric wave absorption in the sample (20F) composed of only the ferrite powder and the sample (20FS23) having a ratio of the stainless steel powder of 40 volume percent were about 30 dB at about 7 GHz and about 25 dB at about 6 GHz, respectively. As the internal ratio of the stainless steel powder was decreased, the amount of electric wave absorption tended to increase. As the internal ratio thereof was increased, the amount of electric wave absorption was decreased, and in addition, the center frequency tended to be shifted to the lower frequency.

EXAMPLE 3

Laminated magnetic woody material samples were prepared under the same conditions as in Example 1 except that the internal ratio (S:F) of the stainless steel powder to the ferrite powder was 2:3 and the thicknesses of the magnetic layer were 0.5 mm, 1.0 mm, 1.5 mm, 2.0 mm, and 4.0 mm. FIG. 5 shows the measurement results of the amount of electric wave absorption in the frequency range of 0.05 to 12 GHz at which measurements were carried out. When the thickness of the magnetic layer was 1.5 mm, a maximum amount of electric wave absorption of about 30 dB was obtained at about 4.5 GHz. The results showed that as the thickness of the magnetic layer increased, the center frequency was shifted to the lower frequency band. Furthermore, in the case where the internal ratio of the stainless steel powder was low, as the thickness of the magnetic layer decreased, the amount of electric wave absorption tended to increase.

EXAMPLE 4

Laminated magnetic woody material samples were prepared under the same conditions as in Example 1 except that the internal ratio (S:F) of the stainless steel powder to the ferrite powder was 4:1 and the thicknesses of the magnetic layer were 0.5 mm, 1.0 mm, 2.0 mm, and 4.0 mm. FIG. 6 shows the measurement results of the amount of electric wave absorption in the frequency range of 0.05 to 12 GHz at which measurements were carried out. When the thickness of the magnetic layer was 4.0 mm, a maximum amount of electric wave absorption of about 25 dB was obtained at about 2.4 GHz. The results showed that as the thickness of the magnetic layer increased, the center frequency was shifted to the lower frequency band. Furthermore, in the case where the internal ratio of the stainless steel powder was high, as the thickness of the magnetic layer increased, the amount of electric wave absorption tended to increase.

Table 3 shows the measurement results of the center frequency $f_0$, the maximum amount of absorption $S_{max}$, and the half-width ΔW in the above examples in comparison with the results of the samples composed of only the ferrite powder and only the stainless steel powder.

TABLE 3

| Component of magnetic layer | Thickness of magnetic layer dM | Type of sample | Center frequency $f_0$ [GHz] | Maximum amount of absorption $S_{max}$ [dB] | Half-width ΔW [GHz] |
|---|---|---|---|---|---|
| Magnetic powder | 1.0 mm | 20F (20 Vol %) | 6.92 | 12.02 | 4.33 |
| | | 30F (30 Vol %) | 6.80 | 28.12 | 0.837 |
| | 4.0 mm | 20F (20 Vol %) | 2.56 | 18.96 | 6.956 |
| | | 30F (20 Vol %) | 1.30 | 11.61 | 3.41 |

TABLE 3-continued

| Component of magnetic layer | Thickness of magnetic layer dM | Type of sample | Center frequency $f_0$ [GHz] | Maximum amount of absorption $S_{max}$ [dB] | Half-width ΔW [GHz] |
|---|---|---|---|---|---|
| Magnetic powder and stainless | 1.0 mm | 20SF23 (S:F = 2:3) | 6.50 | 10.83 | 4.90 |
| | | 20S (Stainless steel only) | 6.50 | 4.874 | — |
| steel powder Vs = 20 | 4.0 mm | 20SF23 (S:F = 2:3) | 2.62 | 45.18 | 0.120 or less |
| Vol % | | 20S (Stainless steel only) | 2.98 | 6.446 | — |

FIG. 7 shows distributions of electric wave absorption characteristics, which are shown by concentration differences, in the case where the volume ratio of the nonmagnetic stainless steel powder to the ferrite powder and the thickness of the magnetic layer are changed in samples in which the total volume content values of the ferrite powder and the nonmagnetic stainless steel powder in the magnetic layer are 10, 20, and 30 volume percent. A relatively high maximum amount of absorption was concentrically distributed around the lower right point of the distribution maps. As the volume content increased, the radii of the concentric circles also tended to increase.

As shown in Table 3, regarding the electric wave absorption characteristics, when the volume content Vs was 20 volume percent, the internal ratio was represented by stainless steel powder:ferrite powder=2:3, and the thickness of the magnetic layer was 4.0 mm, a maximum amount of electric wave absorption was obtained with a center frequency $f_o$ [GHz] of 2.62, a maximum amount of absorption $S_{max}$ [dB] of 45.18, and a half-width ΔW [GHz] of 0.120 or less.

INDUSTRIAL APPLICABILITY

The woody electric-wave-absorbing building material of the present invention has not only a property of woodiness but also an excellent electric wave absorption characteristic. Therefore, by using the woody electric wave absorber as (a) building materials (such as a woody wall surface material, a ceiling material, a woody door material, a floor material, and a partition) used in music halls, restaurants, hospitals, nursing homes, wooden buildings, schools, or the like, (b) security functional materials for home information appliances, (c) furniture, (d) office supplies and stationery, or the like, electric wave interference is prevented and the number of potentially dangerous electric waves is reduced to improve the living environment.

Figure 1:
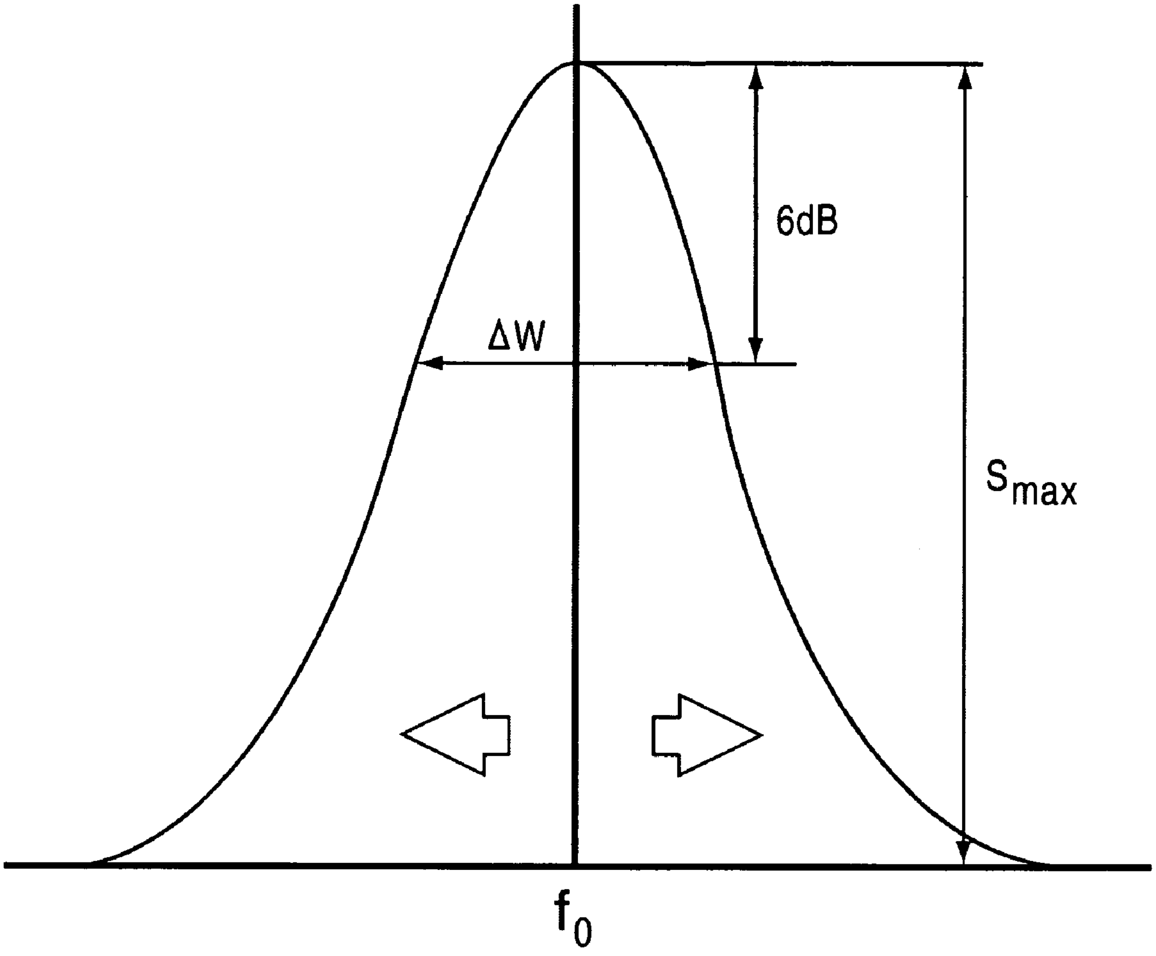
FIG. 1 is a graph showing design parameters of an electric wave absorber.
Figure 2A:
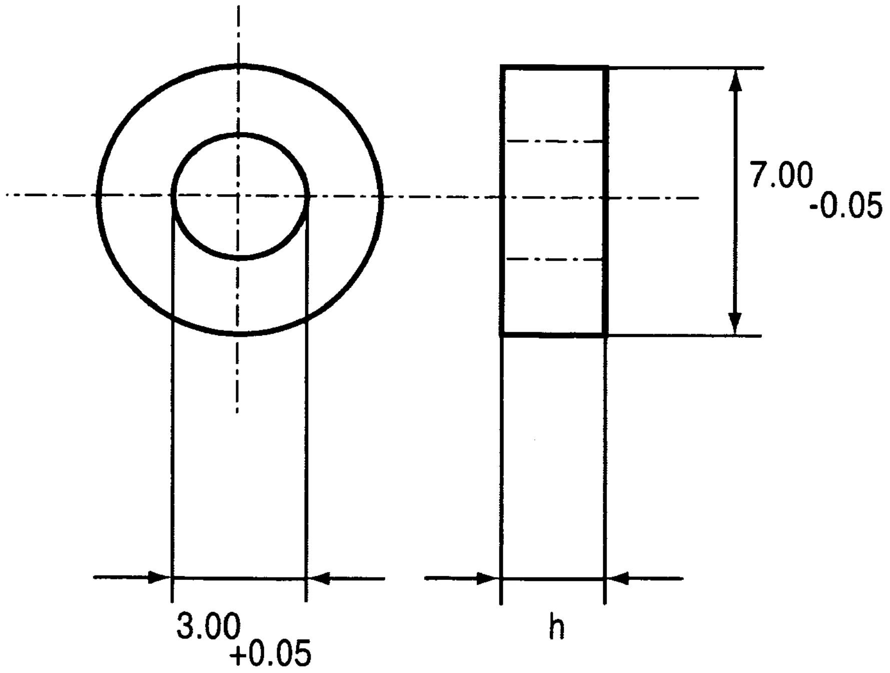
FIG. 2 includes a front view and a side view (A) that show the shape and dimensions of an annular sample for measuring the electric wave absorption characteristic, and a cross-sectional view (B) showing a state in which the annular sample is set in a sample holder.
Figure 2B:
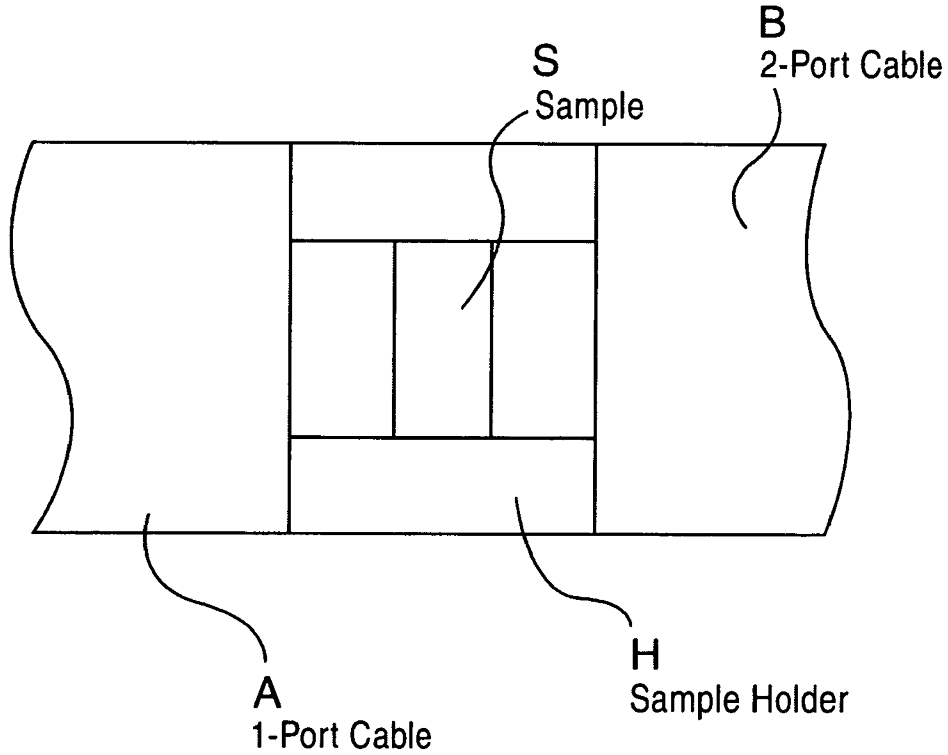
Figure 3A:
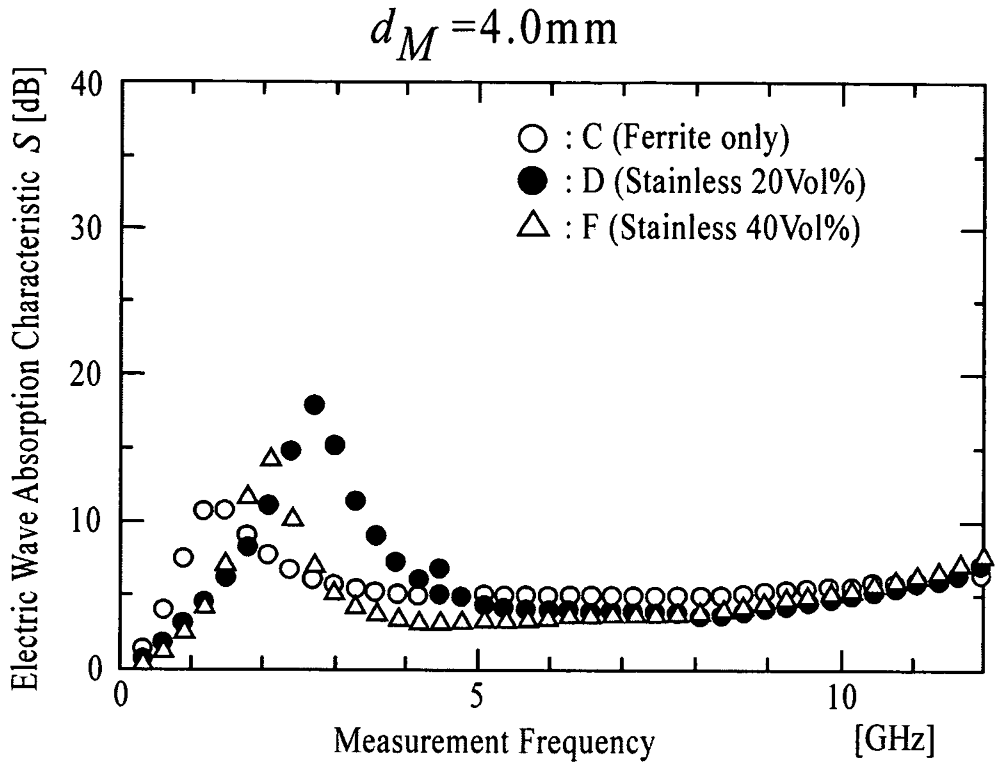
FIG. 3 is a graph showing the electric wave absorption characteristics of samples in Example 1.
Figure 3B:
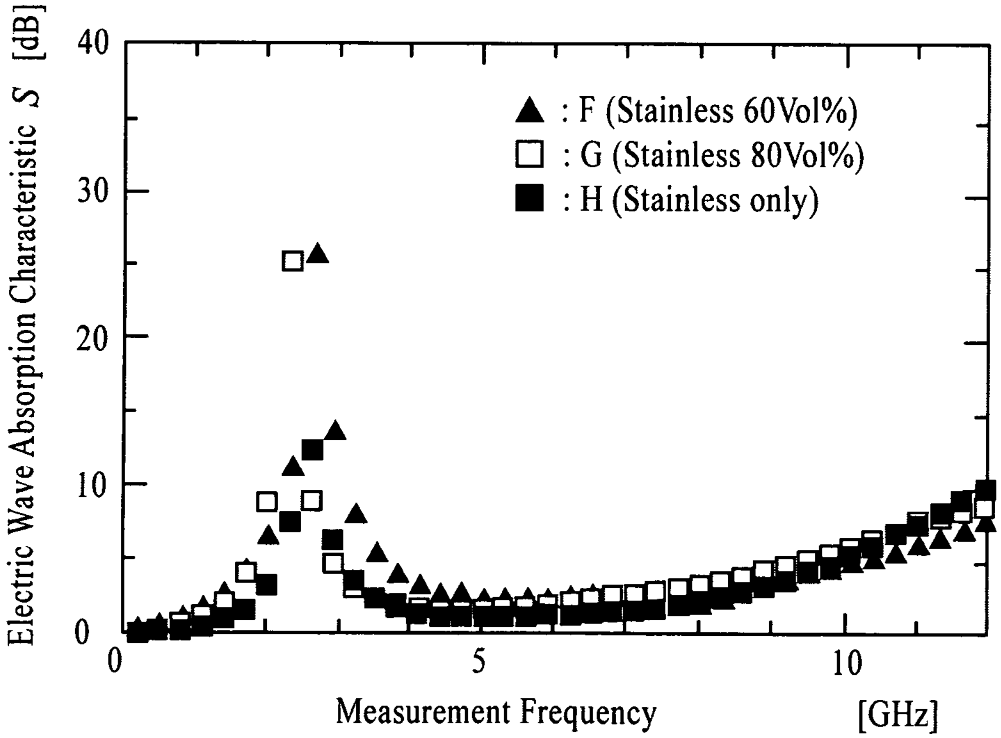
Figure 4A:
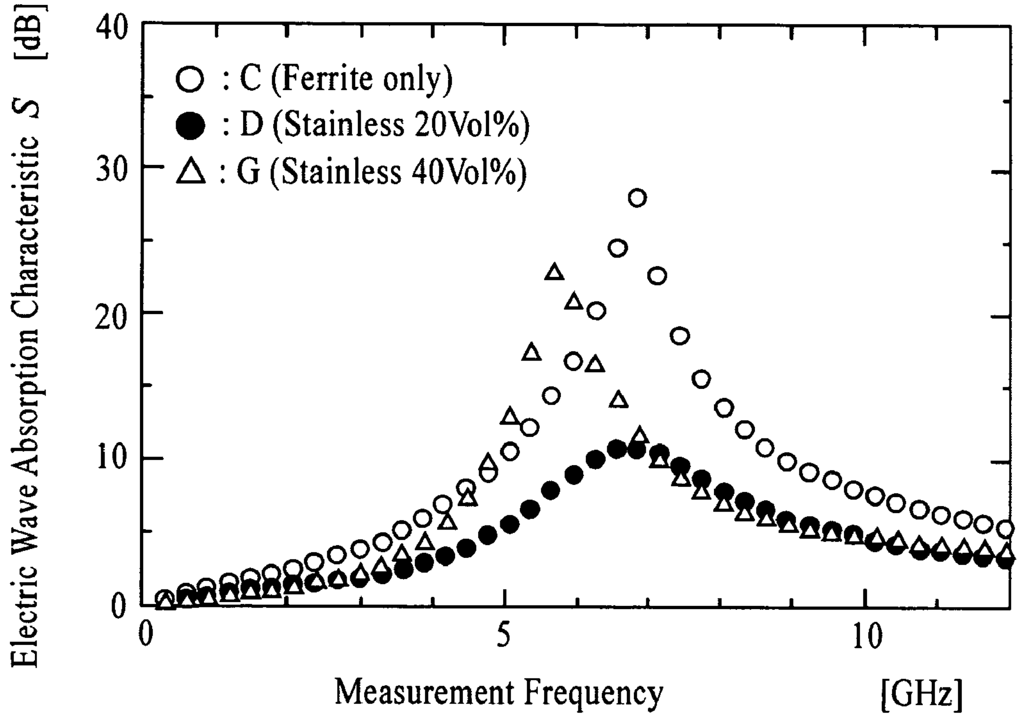
FIG. 4 is a graph showing the electric wave absorption characteristics of samples in Example 2.
Figure 4B:
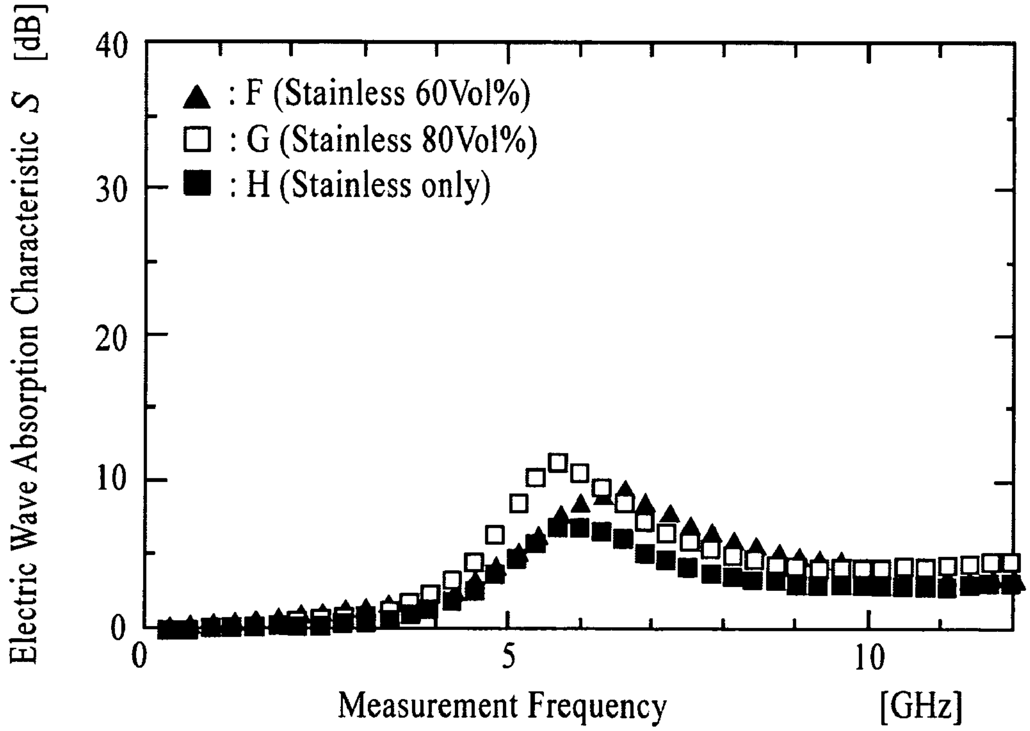
Figure 5:
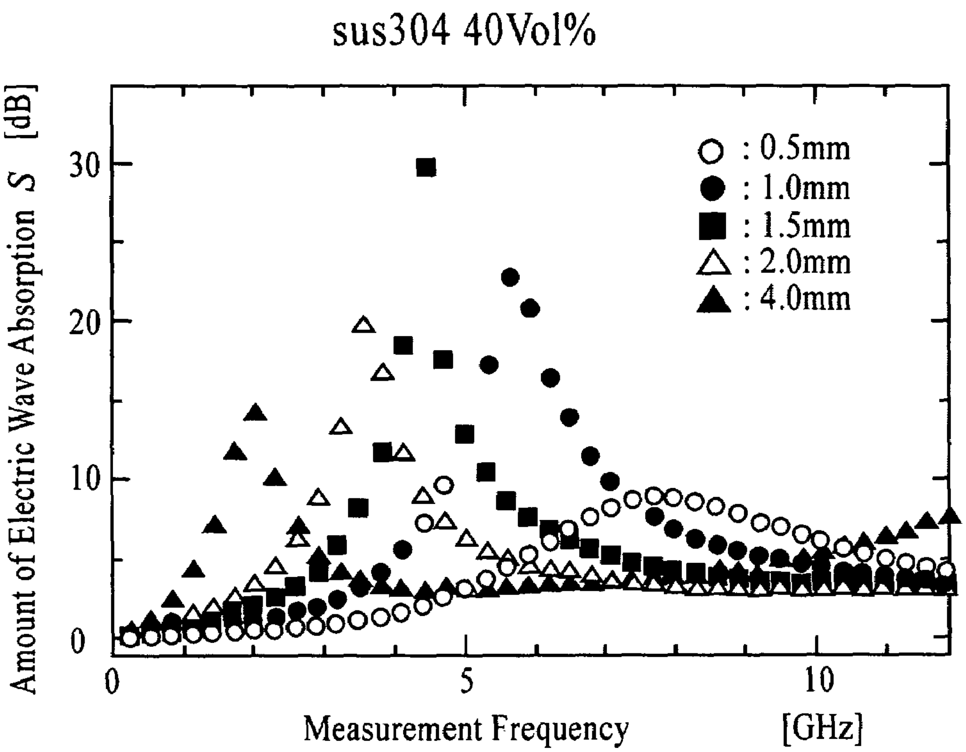
FIG. 5 is a graph showing the electric wave absorption characteristics of samples in Example 3.
Figure 6:
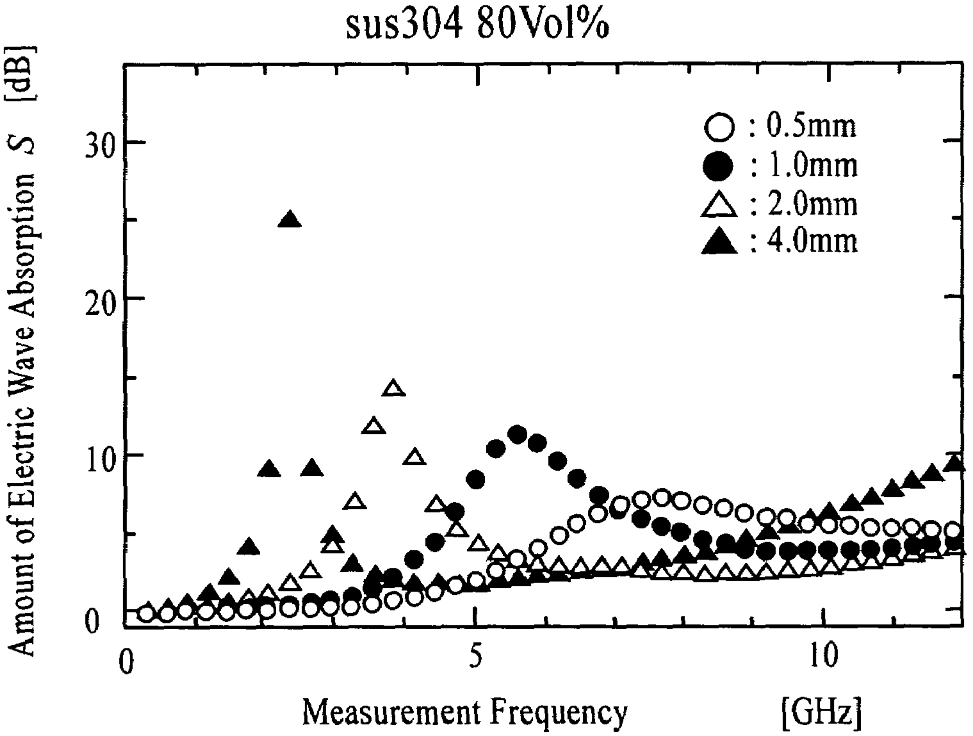
FIG. 6 is a graph showing the electric wave absorption characteristics of samples in Example 4.
Figure 7A:
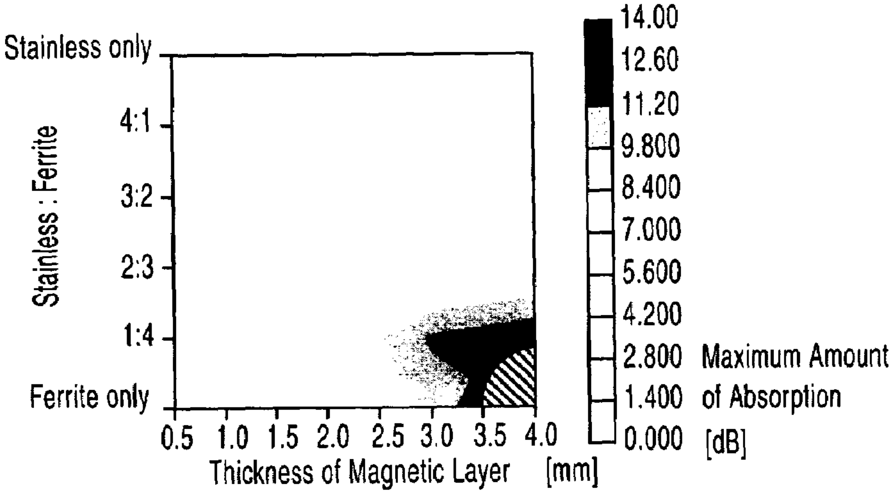
FIG. 7 includes distribution maps of the electric wave absorption characteristics of samples in Examples and Comparative Examples.
Figure 7B:
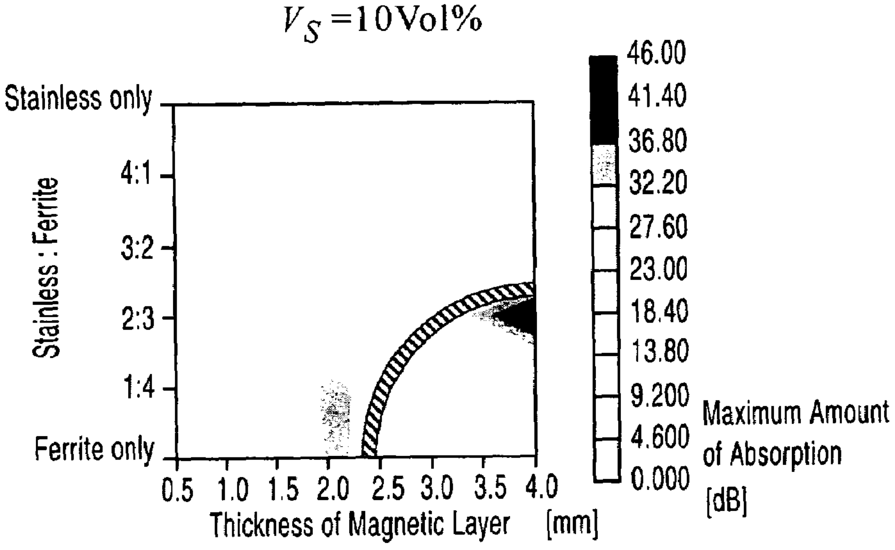
Figure 7C:
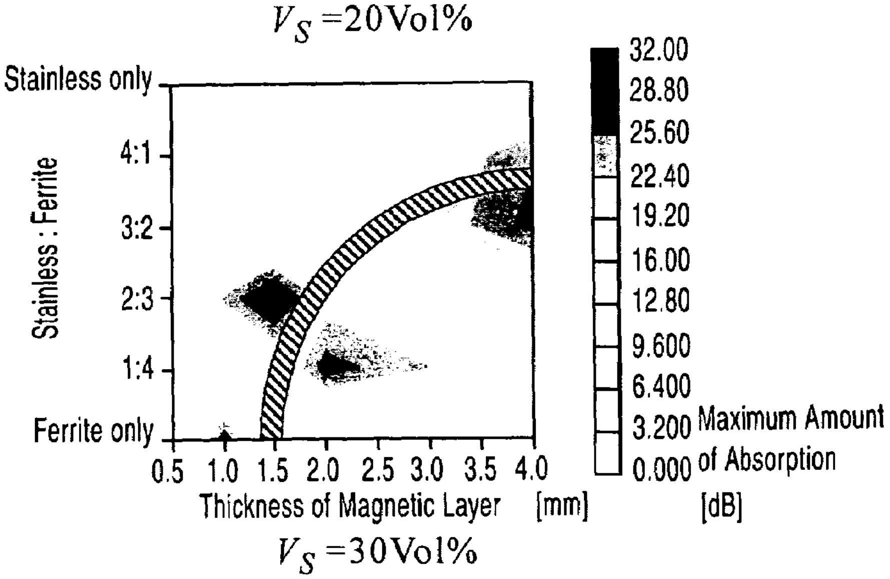

The invention claimed is:

1. A woody electric-wave-absorbing building material comprising:

two or more woody plates composed of natural wood or a processed woody material;

a magnetic layer composed of an adhesive containing a ferrite powder interposed between two of the woody plates, wherein the magnetic layer contains a nonmagnetic austenite stainless steel powder in an amount in the range of 30 to 50 volume percent relative to a Mn—Zn ferrite powder, the total volume content of the ferrite powder and the nonmagnetic austenite stainless steel powder in the magnetic layer is in the range of 10% to 40%, the thickness of the magnetic layer is in the range of 1.0 to 4.0 mm, and the electric-wave-absorbing building material has an electric wave absorption characteristic in which the center frequency of the electric waves absorbed lies in the range of1 to 8 GHz and the amount of electric wave absorption is 20 dB or more in a 2.45 GHz frequency band.

2. The woody electric-wave-absorbing building material according to claim 1, wherein the nonmagnetic austenite stainless steel powder comprises SUS 304 stainless steel.

3. The woody electric-wave-absorbing building material according to claim 2, wherein the ferrite powder has a median particle size in the range of 50 to 60 μm and a particle size range of 45 to 75 μm.

* * * * *